US009236804B2

(12) United States Patent
Pal et al.

(10) Patent No.: US 9,236,804 B2
(45) Date of Patent: Jan. 12, 2016

(54) REGULATED CONTROLLER WITH SELF-ADJUSTING OUTPUT SET-POINT CONTROL

(71) Applicant: General Electric Company, Schenectady, NY (US)

(72) Inventors: Subarna Pal, Wylie, TX (US); Richard Hock, Farmersville, TX (US)

(73) Assignee: General Electric Company, Schenectady, NY (US)

( * ) Notice: Subject to any disclaimer, the term of this patent is extended or adjusted under 35 U.S.C. 154(b) by 287 days.

(21) Appl. No.: 13/726,585

(22) Filed: Dec. 25, 2012

(65) Prior Publication Data

US 2013/0163287 A1 Jun. 27, 2013

Related U.S. Application Data (60) Provisional application No. 61/579,099, filed on Dec. 22, 2011.

(51) Int. Cl.
*H02M 3/335* (2006.01)
*H02M 1/00* (2007.01)

(52) U.S. Cl.
CPC .. *H02M 3/33515* (2013.01); *H02M 2001/0025* (2013.01)

(58) Field of Classification Search
CPC ............ H02M 3/335; H02M 3/33515; H02M 3/33569; Y02B 70/126; Y02B 70/1433
USPC ......... 363/15–20, 21.01–21.18; 323/299–303
See application file for complete search history.

(56) References Cited

U.S. PATENT DOCUMENTS

| 7,050,314 | B1 * | 5/2006 | Vashchenko et al. ........... 363/60 |
| 7,400,061 | B2 | 7/2008 | Steigerwald et al. |
| 7,403,400 | B2 | 7/2008 | Stanley et al. |
| 7,420,823 | B2 | 9/2008 | Lanni |
| 7,430,130 | B2 | 9/2008 | Devey |
| 7,502,233 | B2 | 3/2009 | Kim et al. |
| 7,511,972 | B2 | 3/2009 | Mohandes |
| 7,515,439 | B2 | 4/2009 | Leu |
| 7,656,691 | B2 | 2/2010 | Nielsen et al. |
| 7,952,892 | B2 | 5/2011 | Orr |
| 7,991,511 | B2 * | 8/2011 | Zhang et al. .................. 700/286 |
| 8,339,810 | B2 | 12/2012 | Ratnaparkhi et al. |
| 8,358,098 | B2 | 1/2013 | Skinner et al. |
| 8,411,476 | B2 | 4/2013 | Christensen |
| 8,446,134 | B2 | 5/2013 | Manor et al. |
| 8,737,024 | B2 * | 5/2014 | Nanov ............................ 361/18 |
| 2008/0243413 | A1 * | 10/2008 | Kasztenny et al. ............. 702/85 |
| 2009/0097280 | A1 * | 4/2009 | Wu et al. ......................... 363/17 |
| 2013/0343094 | A1 | 12/2013 | Karlsson et al. |

FOREIGN PATENT DOCUMENTS

| EP | 2594002 B1 | 9/2014 |
| WO | 2012116750 A1 | 9/2012 |
| WO | 2013113354 A1 | 8/2013 |

* cited by examiner

Primary Examiner — Adolf Berhane
Assistant Examiner — Yemane Mehari
(74) Attorney, Agent, or Firm — General Electric Company (57) ABSTRACT

A power conversion system includes a power converter that converts an input voltage into a DC output voltage. Additionally, the power conversion system also includes a controller that provides a self-adjusting set-point control scheme for the power converter. A method of power conversion system operation is also provided.

12 Claims, 5 Drawing Sheets

REGULATED CONTROLLER WITH SELF-ADJUSTING OUTPUT SET-POINT CONTROL

CROSS-REFERENCE TO RELATED APPLICATION

This application claims the benefit of U.S. Provisional Application Ser. No. 61/579,099, filed by Subarna Pal and Richard Hock on Dec. 22, 2011 entitled "Regulated Converter With Self-Adjusting Output Set-Point Control", commonly assigned with this application and incorporated herein by reference. Subsequently, Dec. 22, 2012 fell on a Saturday followed by a closure of the U.S. Patent Office for Christmas Eve (by executive order) and Christmas Day.

TECHNICAL FIELD

This application is directed, in general, to power conversion and, more specifically, to a power conversion system and a method of power conversion system operation.

BACKGROUND

As the human population grows, there is a constant need to provide more power without using up or misusing Earth's resources. Power converter circuit market trends indicate that each new generation of converter products can sometimes deliver increased power density and higher efficiency, having reduced total power loss. In one example application, an intermediate bus power system includes a bus converter circuit that provides a DC bus voltage to a plurality of point-of-load converters circuits (POLs) through an intermediate bus structure. Each of the plurality of POLs provides a separate output voltage to a load. It is beneficial to have an efficient system because the power is distributed to multiple loads and end uses.

SUMMARY

Embodiments of the present disclosure provide a power conversion circuit system and a method of power conversion system operation.

In one embodiment, the power conversion system includes a power converter that converts an input (e.g. DC, AC, ramp, etc.) voltage into a DC output voltage. Additionally, the power conversion system also includes a controller that provides a self-adjusting set-point control scheme for the power converter.

In another aspect, the method includes converting an input voltage to a DC output voltage and providing a self-adjusting set-point control scheme for conversion of the input voltage to the DC output voltage.

The foregoing has outlined preferred and alternative features of the present disclosure so that those skilled in the art may better understand the detailed description of the disclosure that follows. Additional features of the disclosure will be described hereinafter that form the subject of the claims of the disclosure.

BRIEF DESCRIPTION

Reference is now made to the following descriptions taken in conjunction with the accompanying drawings, in which.

DETAILED DESCRIPTION

This disclosure provides a power converter circuit system (e.g. having a switching voltage regulator) that is efficient and operates at high duty cycle over most of or an entire input voltage operating range while providing regulation and its attendant benefits. In one embodiment, an output voltage of the power converter system follows changes in the input voltage over some sub-range of the input voltage while the system still remains in active regulation (e.g. by using a switching duty cycle just below the maximum duty cycle, within 5-10% of maximum or within test-optimized values). The sub-range of the input voltage that is tracked is based on adapting and automatically (self) adjusting a set point value that then determines the output voltage or adjusts the output voltage. For example, a dc-dc bus converter includes a processor that is configured to automatically adjust the output voltage regulation set-point as a function of the input voltage and sometimes as a function of other variables. The processor selects the output voltage regulation set-point value such that the duty cycle is as high as possible at that operating condition and yet still provides active regulation of the dc-dc bus converter. The system uses the set-point value as a reference that is compared with the output voltage. The processor then adjusts the duty cycle to produce the desired output voltage. In this manner, the converter system provides beneficial load regulation, line/load transient and other desirable characteristics. For instance, if the set-point value is selected to track the input voltage, the volt-time (or maximum amount of time that an inductor or transformer can have a constant voltage applied to it) applied across the output inductor over the operating input voltage range remains substantially constant. The inductor can then be readily optimized for a desired output ripple and saturation flux density. The output ripple of the converter and overall RMS (root-mean-square or average) current flowing through the inductor can also be reduced, which provides a quieter output power.

The procedures described below can be employed in various types of power converter electronics such as DC to DC converters, bus converters, rectifiers and so on. For example, a bus converter system can take a noisy input voltage from an AC or DC source that varies unevenly over time or over a range of voltages such as 48 to 96 volts; and then the bus converter system filters the input voltage source and produces and distributes a quiet output bus voltage. The bus converter system with ensuing POLs can function over a wide input bus voltage range where the subsequent POLs then provide precise, regulated step-down or step-up output voltages. In addition, POLs exhibit a constant input power characteristic assuming a constant efficiency. These POL converters may then be used to power electronic loads that need a fixed supply voltage having precise regulation in order to operate properly. Although POLs can operate over a wide input range and tolerate bus voltage variations inherent in unregulated or semi-regulated bus converters, it is advantageous to have the intermediate bus converter system. The intermediate bus converter produces good output load regulation, low output impedance, and good transient response characteristics so that the small, inexpensive POLs (attached to the output of the bus converter) can operate easily and properly. For instance, the low output impedance of the intermediate, regulated bus converter helps to minimize cross-talk between POLs due to lower common coupling impedance.

Overall power loss considerations in high-efficiency, isolated and regulated bus converters lead to an understanding of the loss contribution due to each element of the bus converter design. For example, one loss contribution entails resistive losses. Because bus converters provide high output currents, particular attention is given to resistive power losses (i.e., $I^2R$ losses) especially on the output or secondary side of the power converter. Additionally, operating a power converter at a high duty cycle yields increased efficiency since this provides reduced average or RMS (root-mean-square) currents flowing in the power stage. Further, operating a power converter at slightly less than the maximum duty cycle over the entire input voltage range reduces the volt-time specification on an output inductor. These are beneficial since they enable the use of an output inductor with lower resistance, while still avoiding inductor saturation over an entire input voltage range. Other than at the output, the input inductance value may also be reduced as well, since the high duty cycle reduces input ripple current.

Figure 1:
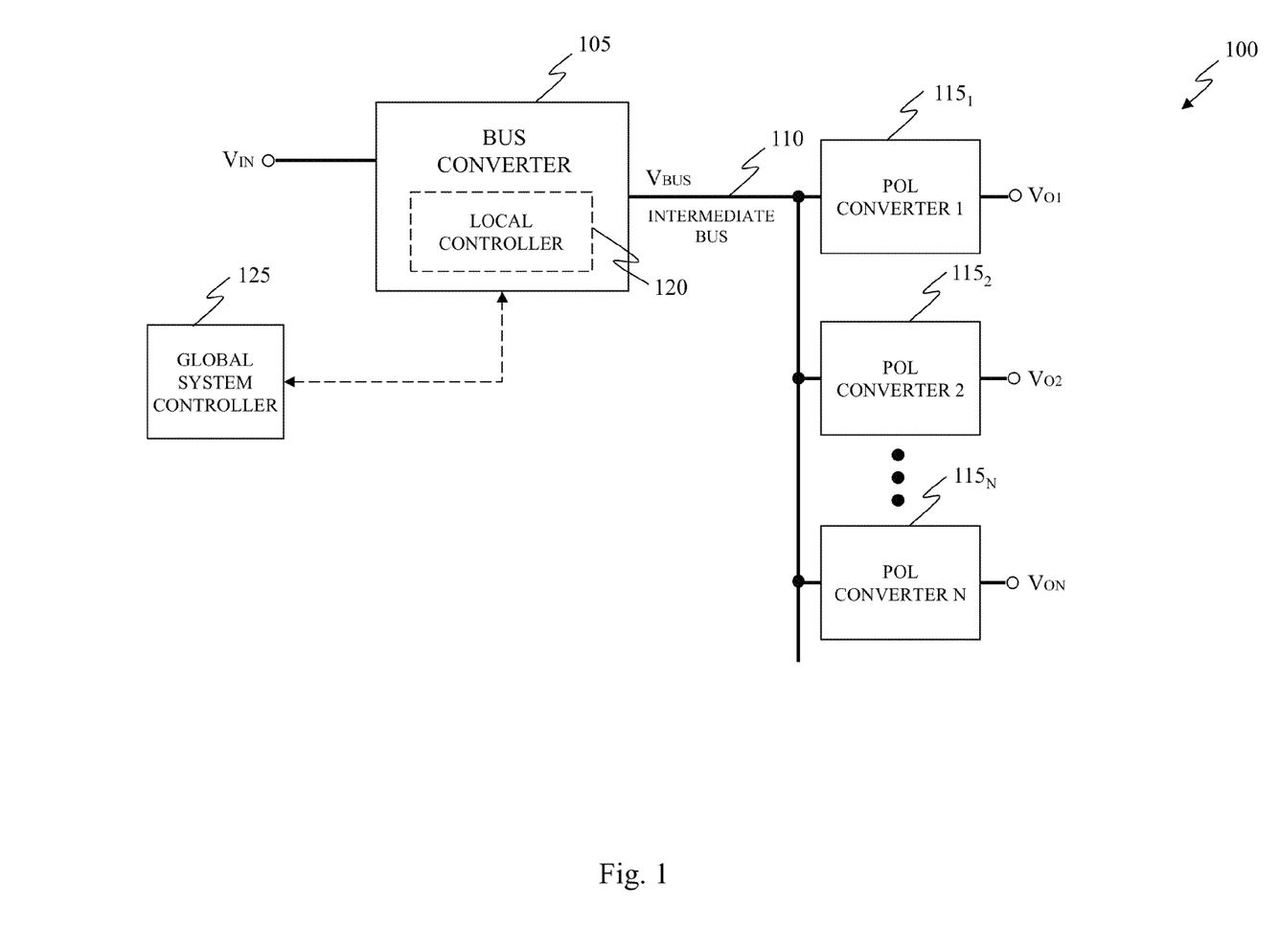
FIG. 1 illustrates a block diagram of an embodiment of as an intermediate bus power system employing a power conversion system constructed according to the principles of the present disclosure.

FIG. 1 illustrates a block diagram of an embodiment of an intermediate bus power system 100, employing power conversion circuits constructed according to the principles of the present disclosure. The intermediate bus power system 100 includes a bus converter 105 that converts an input AC or DC voltage $V_{IN}$ into a DC bus voltage $V_{BUS}$ on an intermediate bus 110. In one exemplary application, the intermediate bus power system 100 also includes a plurality of point-of-load converters (POLs) $115_1, 115_2, \ldots, 115_N$, having inputs connected to the intermediate bus 110, that supplies a corresponding plurality of output voltages $V_{O1}, V_{O2}, \ldots, V_{ON}$ from the bus voltage $V_{BUS}$.

The intermediate bus power system 100 further includes a local controller 120 and a global system controller 125 that are coupled to the bus converter 105 and control system 100's overall operation. In one embodiment, the local controller 120 operates in conjunction with the global system controller 125, where the global system controller 125 may be a more general or hierarchical controller that provides supervisory and overriding control of the intermediate bus power system 100.

The exemplary bus converters in this disclosure employ a full-bridge or half-bridge power stage. But other topologies such as a two-switch forward, LLC, fly-back etc., can also utilize these concepts. Higher power bus converters can employ the full-bridge topology since it offers good transformer utilization while lower power bus converters can employ a less complex half-bridge topology. Moreover, controlled synchronous rectifiers provide substantial efficiency advantages when employed in bus converters since the output voltage provided by these converters permits the use of low-loss devices.

Figure 2:
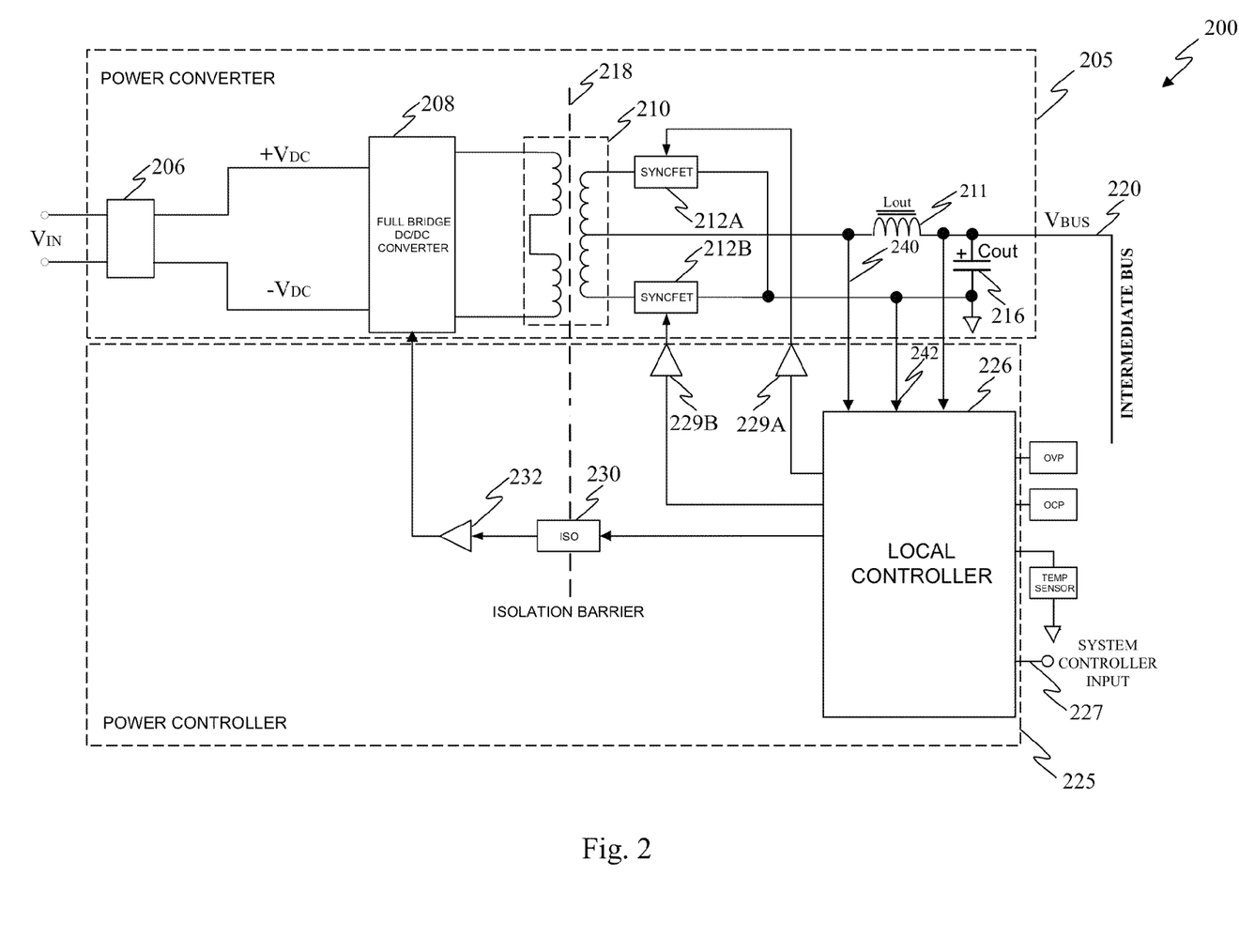
FIG. 2 illustrates a block diagram of a power conversion module as may be employed in the bus converter of FIG. 1.

The concepts discussed herein may be used with a variety of isolated or non-isolated power topologies. However, the following description focuses on an isolated full-bridge topology since it is well suited for high power bus applications. It offers the capability of operating near a 100 percent duty cycle, which provides substantially continuous power flow. The duty cycle D is defined as the switching transistor on-time divided by a half-cycle time. Also, the maximum voltage stress on input power switches is equal to the input voltage, ignoring switching transients, which permits selection of lower conduction resistance for switching devices such as FETs (field effect transistors). The output voltage to input voltage transfer ratio is given by the following equation.

$$V\text{out} = V\text{in} \times N2/N1 \times D, \quad (1)$$

where: N2/N1 is the ratio of the bus converter transformer secondary turns N2 to primary winding turns N1 and D is the duty cycle. The primary side of the transformer (e.g. 210 in FIG. 2) is coupled to input voltages and capable of seeing a $+V_{DC}$ to $-V_{DC}$ voltage swing from one half-cycle to the next half-cycle, thus yielding good utilization of the magnetic structure.

FIG. 2 illustrates a block diagram of a power conversion module, generally designated 200, as may be employed in the bus converter 105 of FIG. 1. The power conversion module 200 employs secondary control architecture and includes a power converter 205 and a power controller 225. The power converter 205 has primary and secondary stages that are electrically isolated from each other across an isolation barrier 218 of transformer 210 and has separate primary and secondary grounding structures. The power controller 225 also employs the isolation barrier 218 to electrically isolate primary and secondary stage components referenced to the separate grounding structures.

The power converter 205 is connected to convert an input voltage Vin (or a differential voltage $+V_{DC}$ to $-V_{DC}$) to a DC output voltage $V_{BUS}$ on an intermediate bus 220. The power converter 205 includes an input voltage conditioning module 206, a full bridge DC-DC converter 208, a main power transformer 210, an output inductor 211, first and second synchronous output switches (e.g., FETs) 212A, 212B, and an output filter capacitor (Cout) 216. Depending on the design specification and application, the output filter capacitor (Cout) 216 may be comprised of an output filter capacitor contained within the power converter 205 and a filter capacitor that is external to the power converter 205. The main power transformer 210 forms part of the isolation barrier 218. The power controller 225 includes a local controller 226 having a system controller input 227, first and second secondary switch drivers 229A, 229B, an optical isolator 230 and a primary switch driver 232. The optical isolator 230 also forms part of the isolation barrier 218. Additional elements such as bias supplies to power up the circuits are not shown.

During operation, the input voltage conditioning module 206 provides rectification when the input voltage Vin is an AC signal. It additionally provides filtering of the input voltage Vin for both the AC signal and for the case of a DC input voltage. In one embodiment, the full bridge DC-DC converter 208 provides a full wave signal to primary windings of the main power transformer 210. The secondary windings of the main power transformer 210 then provide a full wave secondary signal to the first and second synchronous output switches 212A, 212B for rectification. A rectified output signal is provided from a secondary winding center tap of the main power transformer to an output filter containing the output inductor 211 and the output filter capacitor 216. A bus voltage $V_{BUS}$ is provided on an intermediate bus 220, as shown.

The power controller 225 provides operating control of the power converter 205 allowing it to deliver output voltage and output current to the intermediate bus 220, based on established or self-adjusting set points and feedback information from the converter output. The local controller 226 establishes control signals (e.g., pulse width modulation (PWM) signals) that are provided through the primary and first and second secondary switch drivers 232, 229A and 229B to control conduction times of the primary and secondary stages. Alternatively, other control schemes may vary the frequency to control the output, using FDM modulation, or a combination of PWM and FDM. The optical isolator 230 provides electrical isolation for primary control signals, as noted above. Although analog or analog-mixed signal embodiments are possible (e.g. using amplifiers, comparators, filters, clock circuits, ramp circuits, etc.), the local controller 226 described herein is embodied as a digital controller used to perform regulation and control of the power converter 205. More specifically, the local controller 226 may include an algorithm or algorithms embodied in computer code executing on a digital controller IC. The digital controller entails few components or chips on a printed circuit board, thus saving board space. The digital controller also permits end-users to make revisions to the software, such as programming an initial set-point value and other parameters or monitoring a system performance. The digital controller forms part of a control loop to transform an unregulated Vin voltage to an output voltage $V_{BUS}$ that is much cleaner and can be readily distributed to and used by, for example, POLs.

In the illustrated embodiment of FIG. 2, the power converter 205 uses the local controller 226 to automatically change an output voltage regulation set-point value of the DC bus voltage $V_{BUS}$ as a function of the input voltage $V_{IN}$. The local controller 226 selects the output voltage regulation set-point such that a selected duty cycle is as large as possible for the operating condition and yet still provides an active regulation loop. This insures that the power converter 205 provides the desired load regulation and line/load transient characteristics. It uses that set-point as a reference, which is then compared to the output voltage by a control loop.

The control loop then adjusts the duty cycle to produce a desired output voltage. If the regulated set-point is selected to follow the input voltage, the volt-time impressed across the output inductor 211 over the operating input range is essentially constant and less than that used for a conventional fixed output voltage, regulated converter. The output inductor 211 can then be optimized (e.g. decreasing turns, lower inductance) for an output ripple and saturation flux density. The output ripple of the power converter 205 and overall RMS current flowing through the output inductor 211 will also be reduced.

A maximum duty cycle point for the power converter 205 is determined by design specifications for the chosen power stage topology or customer's applications and so on. To insure proper switching in the converter, time is allotted for turn-on and turn-off of the various switching devices and synchronous rectifiers. This allotted turn-on and turn-off time (i.e., dead time) is also included in determining a maximum duty cycle operation. The concept is to operate the power converter 205 at a DC bus voltage $V_{BUS}$ corresponding to producing a duty cycle that is slightly less than the maximum duty cycle. This provides a regulation loop that is active along with requisite line, load and transient characteristics of a regulated converter.

In many power topologies where output voltage is a first order function of the input voltage and duty cycle, the concept is to measure the input voltage $V_{IN}$ and use that measurement to set the converter DC bus voltage $V_{BUS}$. The selected voltage set-point of the DC bus voltage $V_{BUS}$ would be a slightly lower output voltage than that achievable at maximum duty cycle. This keeps the duty cycle at less than the maximum value, which insures that the control loop is active. In general, measuring the input voltage $V_{IN}$ is straightforward if an isolated converter has its controller on the primary or input side of an isolation barrier. However, converters that have their controllers on the secondary side (such as the power converter 205) use an input voltage measurement that crosses the isolation barrier. For example, one method to accomplish this is to measure a transformer secondary winding voltage when a primary switch is conducting by employing local controller inputs 240 and 242.

Figure 3:
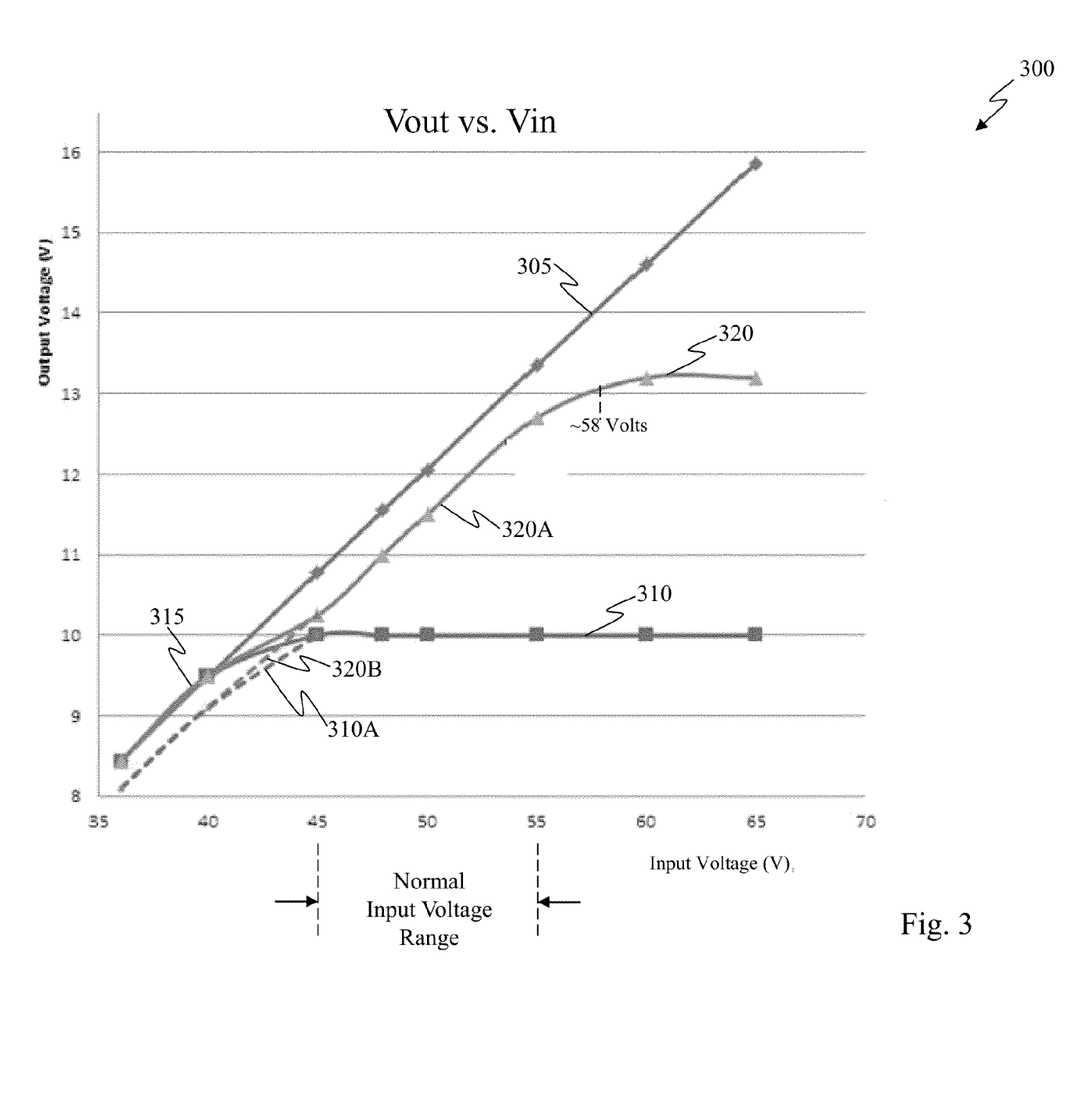
FIG. 3 illustrates examples of input-output voltage characteristics showing three control schemes for a power conversion module.

FIG. 3 illustrates examples of input-output voltage characteristics, generally designated 300, showing three control schemes for a power conversion module. Here, the bus converter employs a step-down transformer having a 4:1 turns ratio with the three control schemes being represented by first, second and third control curves 305, 310, 320. Suppose for this example that a normal input voltage range is between 45 to 55 volts dc (vdc), as indicated, but that a total input voltage range may be 35 to 65 vdc.

The first control curve 305 represents that of an unregulated control loop operating at maximum duty cycle. The output voltage tracks the input voltage over the total input voltage range. The second control curve 310 is for a regulated scheme having a fixed output voltage, where the output is designed to be a constant 10 vdc over a portion of the input voltage range. Its output voltage starts dropping at an input voltage of about 45 vdc, since its regulation loop is duty cycle limited in this range and the bus converter is operating at its maximum duty cycle.

By contrast, the third control curve 320 represents an example of a bus converter input-output voltage characteristic employing an embodiment of the novel self-adjusting set-point control scheme for the bus converter. For example, for part of the control scheme, the control loop is operating at or near the maximum duty cycle, and the output voltage $V_{BUS}$ closely tracks the input voltage Vin. Then for another part of the control scheme, the output voltage $V_{BUS}$ is permitted to plateau and remain substantially constant, particularly when the system is getting near the desired output voltage $V_{BUS}$. Using multiple operation schemes speeds up reaching the target performance specifications and improves efficiency. As another example, suppose for the input voltage range between 45 to 55 vdc, a corresponding output voltage (region 320A) tracks the input voltage. The output voltage at any point in this range is lower than that of the unregulated scheme of the first control curve 305 due to a duty cycle margin reserved to maintain bus converter regulation. As in the regulated case, a corresponding control loop will eventually duty cycle limit with decreasing input voltage thereby causing the bus converter to operate at maximum duty cycle. In this example, this occurs at about 40 volts and below (region 315), as shown.

An input low-voltage shutdown feature can be utilized to prevent this from happening, if desired. If the design specifications are such that the bus converter is regulated at an input voltage Vin of 35 vdc and above, the self-adjusting set-point control scheme can be arranged to continue regulating in that lower input voltage range. The bus converter output voltage then follows the dotted line (region 320B) shown providing about an output voltage $V_{BUS}$ of 8 volts at an input voltage of about 35 vdc and about nine volts at an input voltage Vin of about 40 vdc. In one embodiment, the input low-voltage shutdown feature is designed or configured so that upon low input voltage turn-on or turn-off, the bus converter remains in a regulated mode. That is, the bus converter remains regulated over the entire input voltage range of about 35 to 65 vdc, in this example.

In another embodiment, the regulated output voltage characteristic 310 is designed to maintain an active control loop as an input voltage decreases below the voltage where the control loop would enter duty cycle limit. The variable set-point concept may be utilized as a part of a constant value, regulated output voltage scheme by converting to the variable set-point scheme at and below a designated input voltage. For example, referring to the regulated output voltage curve 310, the variable set-point control scheme is utilized from the input voltage Vin of 35 vdc to 45 vdc (region 310A), and a constant output voltage regulation scheme is utilized in the 45 vdc to 65 vdc input voltage Vin region. This approach results in an output voltage $V_{BUS}$ that is 8 volts at input voltage of 35 vdc, 9 vdc output at 40 volts input and a constant 10 vdc at 45 vdc input and above. Thus, the bus converter remains in regulation with an active control loop throughout most of or all of the entire input operating range between 35 to 65 vdc.

The unregulated output voltage curve 305 shows the output voltage reaching greater than 16 vdc with a 65 vdc input. Consequently, the unregulated conversion scheme (305) may need to shutdown, even if this is a transient condition, to prevent damage to a load at high input voltages, which may cause unwanted system interruption. By contrast, the self-adjusting set-point control scheme 320 can avoid unwanted shutdowns by fixing or adjusting the set-point to a constant value above a predetermined input voltage. FIG. 3 indicates a fixed output of about 13.2 volts above an input voltage of about 58 vdc. In one embodiment, this output voltage limiting feature is included in the control scheme to limit the maximum voltage on the bus to prevent an overvoltage from appearing on the load or perhaps the bus converter output circuitry while avoiding a shutdown condition.

In comparison, the unregulated scheme (curve 305) uses the smallest filter inductor since it provides current during the one percent transition time or freewheeling period. This is approximately 33 nanoseconds (ns) employing a 150 kHz switching frequency. With an output voltage of 13.35 volts at an input voltage of 55 volts, the volt-time specification for the output inductor is 0.44 volt-μsec. The freewheeling period at the input voltage of 55 volts for the fixed output, regulated scheme is 822 ns. The impressed or applied output inductor volt-time is 8.22 volt-μsec, which is more than 18 times greater than that of the unregulated scheme. Correspondingly, for an input voltage of 55 volts, the freewheeling period for the variable set-point scheme is 183 ns, and the impressed output inductor volt-time is 2.32 volt-μsec. Therefore, the relative output inductance used for the variable set-point scheme is about 28 percent of that used for the fixed output, regulated scheme.

A self-adjusting set-point control scheme can be implemented with either analog or digital pulse-width modulation (PWM) control circuitry, or with a combination of mixed signal techniques. A digital PWM control scheme implemented in a processor complements the pertinent measurement parameters such as temperature that are already digitally available (in analog to digital converter format), which together can be used to adjust or optimize the regulating set-point. Further, the digital PWM or FDM controller can also account for variations caused by other parameters such as rapid changes in voltage or changes in resistivity and adapt the converter operation and duty cycle margin to the changes in real time. In one exemplary implementation, the digital PWM controller employs a look-up table based on measured parameters to calculate a required duty cycle for an output voltage set-point. The parameters for the look-up table (e.g., dead time) may be customized for each power converter unit wherein they are determined during the manufacturing process and stored in controller memory, thereby allowing the controller to optimize the power converter operation based on these parameters. The processor in the power converter efficiently transforms the input voltage Vin to the output voltage $V_{BUS}$ with a reduced amount of circuitry. Alternatively, the use of a processor readily allows an end-user to program a set point value or a number of set point values.

If the controller calculates the maximum duty cycle at a given operating point in real time based on additional parameters such as temperature, the set-point control scheme is adaptively configured to account for this. For example, suppose the maximum duty cycle at an input voltage of 55 volts and ambient temperature 60° C. is 99.5 percent as set by the controller based on a calculation or look-up table. The controller has, for example, a pre-selected duty cycle margin of four percent. Then, the controller selects an output voltage set-point that is based on a 95.5 percent duty cycle. If the ambient temperature increases to 80° C. at an input voltage of 55 volts and the maximum duty cycle is determined to be 99.0 percent, the controller then selects an output voltage set-point based on a 95 percent duty cycle. That is, the output voltage is determined by the maximum duty cycle at a given operating condition and a selected duty cycle margin.

In different embodiments, the duty cycle margin may be set either constant or variable depending on system parameters. Such a scheme is utilized to maximize the operating duty cycle while maintaining an active control loop over the temperature and input voltage or other parametric changes that affect maximum duty cycle. This would help the converter deliver higher efficiency. As mentioned, the parameters for the calculation of the maximum duty cycle or data in the look-up table may vary from unit to unit to optimize the performance of each unit. This is accomplished during the manufacturing process.

In another embodiment, a digital PWM controller is also be programmed to have an adjustable regulation margin. For example, it reduces the regulation margin as the output voltage increases since load transients can be more easily accommodated by the output filter capacitors at the higher output voltages. Optionally, the output inductor characteristics are stored so that it can optimize the reference value based on the variation of the inductance variation with load, temperature or other parameters. It may use this information to insure that an output inductor does not saturate. It may also permit saturation of the output inductor at higher input voltages, for example, as in FIG. 3 above 60 volts. A higher ripple on the output voltage resulting from inductor saturation may be acceptable above 60 volts, since the unit is operating above its normal operating range.

In yet another embodiment, the output set-point is also optionally based on the voltage that appears across the output inductor as a reference when a primary switch is conducting. The controller is designed to maintain that voltage at a constant value. A predetermined constant value of voltage appearing across the output inductor during primary switch conduction may include sufficient margin to insure an active regulation loop. This embodiment simplifies the design of the output inductor by utilizing the stored characteristics of the inductor to modify the value of the voltage appearing across the inductor to optimize operation. For example, the inductor is allowed to operate at or near its saturation point to maximize the duty cycle. Alternatively, the output inductor is allowed to saturate at higher input voltages as previously described.

Depending on the application, it is sometimes advantageous to adapt the control scheme to provide a fixed output voltage above a predetermined input voltage as indicated in FIG. 3. This is used to insure that the bus voltage does not increase above a predetermined limit. This may be important to insure that the bus voltage does not exceed the maximum applied voltage that a load can withstand or that the maximum rated voltage on output semiconductor devices and filter components is not exceeded. The output current limit of the converter can also be readjusted concurrently in relation to this self-adjusting regulated set-point. This provides an output having a constant power feature.

Figure 4:
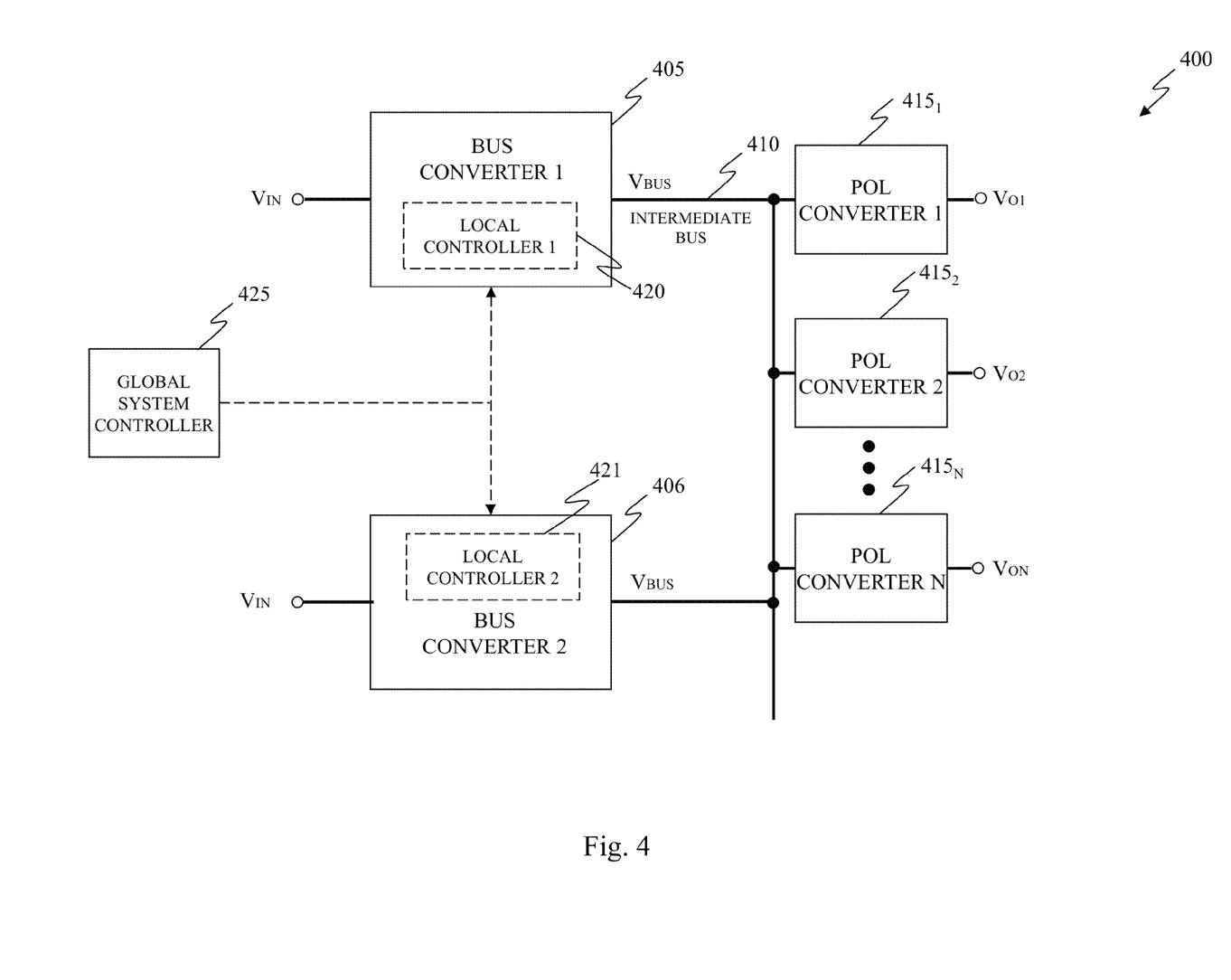
FIG. 4 illustrates a block diagram of another embodiment of an intermediate bus power system constructed according to the principles of the present disclosure.

FIG. 4 illustrates a block diagram of another embodiment of an intermediate bus power system, generally designated 400, constructed according to the principles of the present disclosure. The intermediate bus power system 400 includes first and second parallel connected bus converters 405, 406 that convert an input voltage $V_{IN}$ into a bus voltage $V_{BUS}$ on an intermediate bus 410. Paralleling is needed when a total system load is more than a full power that can be delivered by one bus converter alone. Otherwise, some systems use redundant bus converters in parallel such that if one bus converter shuts down, the other one picks up the system load without any interruption. In the illustrated embodiment, the input voltage $V_{IN}$ is a same input voltage although different input voltages may also be applied. The intermediate bus power system 400 also includes a plurality of POLs $415_1$, $415_2$, . . . , $415_N$, having inputs connected to the intermediate bus 410, that supplies a corresponding plurality of output voltages $V_{O1}$, $V_{O2}$, . . . , $V_{ON}$ from the bus voltage $V_{BUS}$. In some applications, each bus converter's output will have Oring circuitry so as to prevent reverse current flow from the other bus converters in parallel.

The intermediate bus power system 400 further includes first and second local controllers 420, 421 that are respectively coupled to the first and second bus converters 405, 406, as shown. The intermediate bus power system 400 additionally includes a global system controller 425 that is coupled to the first and second bus converters 405, 406.

The first and second local controllers 420, 421 provide local control of the first and second bus converters 405, 406. In different embodiments, the functions can be partitioned among a different set of circuits. For instance, the global system controller 425 may be a more general controller or a hierarchical controller that provides supervisory and overriding control of the intermediate bus power system 400. The local controllers 420, 421 (supported by the global system controller 425) respectively regulate each of the first and second bus converters 405, 406 such that they share a total load current supplied to the intermediate bus 410 equally or in a proportion that yields a higher overall system power efficiency while delivering a required bus voltage $V_{BUS}$.

These load sharing characteristics are constrained by predetermined limits to meet other power system needs (e.g., transient load capability). In one embodiment, these limiting or paralleling conditions are determined by the global system controller 425 and provided to the first and second local controllers 420, 421, which may then provide regulation and control sharing of each of the first and second bus converters 405, 406.

Alternately, this load sharing employs a droop characteristic that does not require communication between the paralleled bus converters 405, 406. The variable set-point scheme can utilize an adaptive droop system that varies the selected pulse width at any operating point along a Vout vs. Vin curve such as the third control curve 320 of FIG. 3. A PWM or FDM controller is programmed to have an adjustable margin. It is programmed to reduce the margin at a minimum load current and increase it at maximum load current. That is, the variable set-point reference at a given input voltage is shifted up slightly as the load current decreases and down slightly as the load current increases. The amount of shift is a design consideration and chosen based on a number of factors including the accuracy of paralleling desired.

Figure 5:
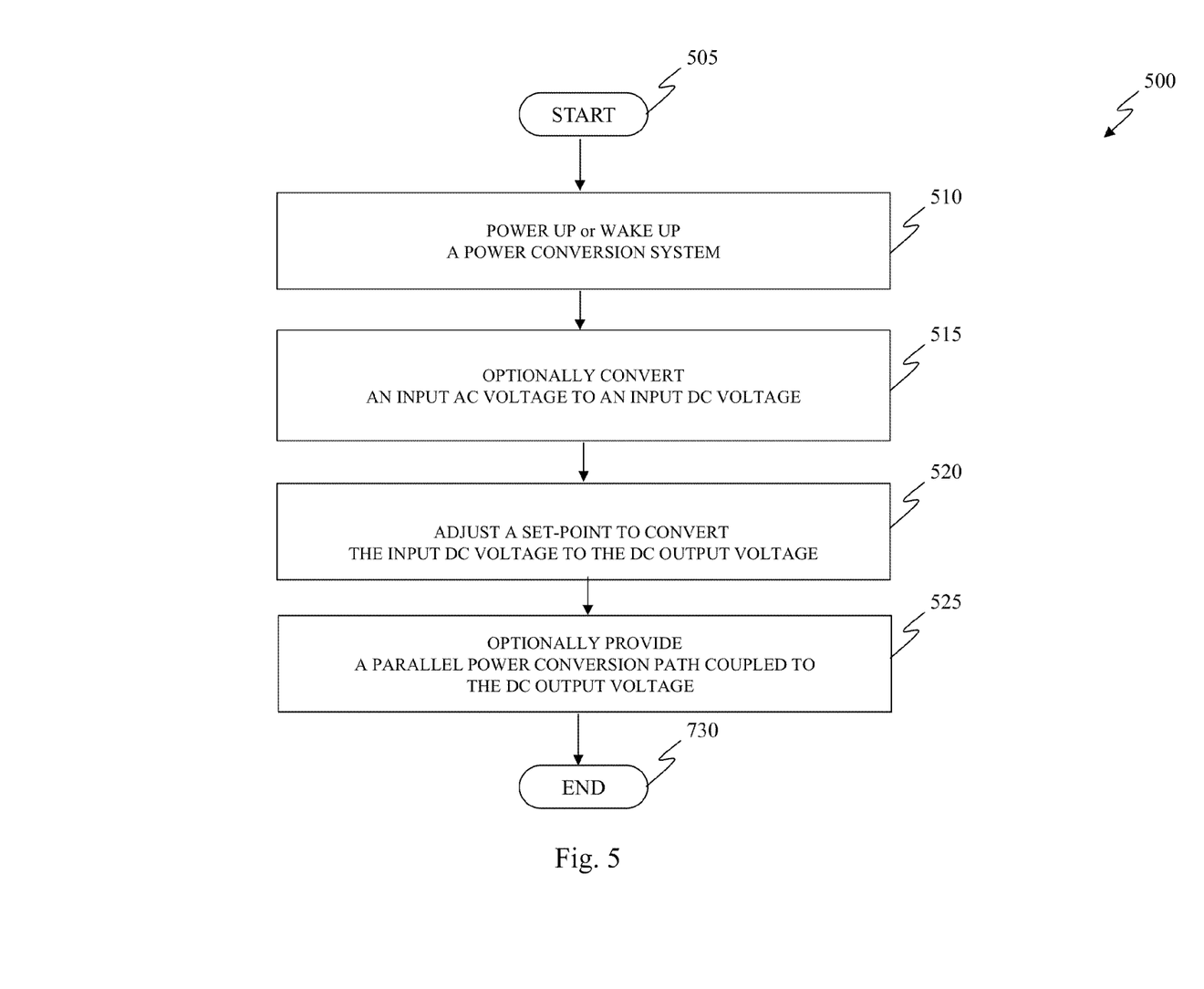
FIG. 5 illustrates a flow diagram of an embodiment of a method of power conversion system operation carried out according to the principles of the present disclosure.

FIG. 5 illustrates a flow diagram of an embodiment of a method of power conversion system operation, generally designated 500, carried out according to the principles of the present disclosure. The method 500 starts at 505 where an input voltage is coupled to the power conversion system to eventually convert the input voltage to a DC output bus voltage. At 510, the power conversion system either powers up or wakes up from a sleep mode. Further, the method 500 is applicable either during a system startup mode or during regular or stable operation of the power conversion system. A self-adjusting set-point control scheme for conversion of the input voltage to the DC output voltage is provided in 520. Through the use of a feedback control loop, the set point is adjusted based on at least the input voltage so that the DC output bus voltage tracks the input voltage until the set point voltage is reached or substantially reached. In 525, there is an optional other parallel power conversion path coupled to the DC output voltage to share the output load current. The optional path provides redundancy or provides additional current that cannot be sourced by a single power converter.

In one embodiment of method 500, the self-adjusting set-point control scheme changes an output voltage regulation set-point of the DC output voltage as a function of the input voltage. In another embodiment, the self-adjusting set-point control scheme employs pulse-width or frequency modulation control, or some combination of the two. In yet another embodiment, the self-adjusting set-point control scheme is implemented through analog or digital control, or some combination of the two. In still another embodiment, the self-adjusting set-point control scheme includes dedicated local conversion control or separate independent conversion control.

In a further embodiment of method 500, the self-adjusting set-point control scheme employs stored parameters to provide control of the input voltage to the DC output voltage conversion. In one case, the stored parameters are specific to a particular power conversion employed—for example, the operating characteristics found during test or manufacturing. In another case, the stored parameters are available in a table look-up format. In yet another case, the stored parameters are selected from the group consisting of a dead time corresponding to control signal switching and a control signal margin. In a yet further embodiment, the stored parameters correspond to an operating characteristic of an output inductor employed in the conversion. When using the parallel power conversion path, the load current is shared by employing an input voltage droop characteristic based on the DC output voltage and the load current. The method 500 ends in 535.

While the method 500 disclosed herein has been described and shown with reference to particular techniques performed in a particular order, it will be understood that these techniques may be combined, subdivided, or reordered to form an equivalent method without departing from the teachings of the present disclosure. Accordingly, unless specifically indicated herein, the order or the grouping of the procedures is not a limitation of the present disclosure.

Those skilled in the art to which this application relates will appreciate that other and further additions, deletions, substitutions and modifications may be made to the described embodiments.

What is claimed is:
1. A power conversion system, comprising:
   a power converter having a primary stage and a secondary stage coupled to provide an output DC voltage from an input voltage source;
   the power converter coupled to a controller; and the controller having a self-adjusting set-point control scheme to generate the output DC voltage, wherein the output DC voltage follows an input voltage over a portion of an entire range of the input voltage, where the portion is based on the input voltage value, wherein the self-adjusting set-point control scheme selects a self-adjusted set point value based on an additional stored parameter that is specific to a particular power converter.

2. The system as recited in claim 1 wherein the self-adjusting set-point control scheme is implemented through active regulation digital control of the power converter.

3. The system as recited in claim 1 wherein the self-adjusting set-point control scheme provides pulse-width modulation (PWM) control of the power converter.

4. The system as recited in claim 1 wherein the self-adjusting set-point control scheme automatically changes an output voltage regulation set-point of the DC output voltage as a function of the input voltage.

5. The system as recited in claim 1 wherein the controller is selected from the group consisting of:
a local controller dedicated to the power converter; and
a system controller separate from the power converter.

6. The system as recited in claim 1 wherein the self-adjusting set-point control scheme selects a self-adjusted set point value to nearly maximize a PWM duty cycle of the power converter.

7. The system as recited in claim 1 wherein the self-adjusting set-point control scheme also adapts a self-adjusted set point value based on temperature.

8. The system as recited in claim 1 wherein the additional stored parameter is selected from the group consisting of:
a dead time corresponding to control signal switching; and
a control signal margin.

9. The system as recited in claim 1 wherein the additional stored parameter corresponds to an operating characteristic of an output inductor employed in the power converter.

10. A power conversion circuit, comprising:
a switching voltage regulator to provide an output DC voltage from an input voltage source;
the switching voltage regulator coupled to a digital controller; and
the digital controller having a self-adjusting set-point control scheme to generate the output DC voltage, wherein the output DC voltage tracks an input voltage over a sub-range of the input voltage until surpassing a self-adjusted set-point value.

11. The circuit as recited in claim 10 wherein the self-adjusted set-point value nearly maximizes a switching duty cycle of the switching voltage regulator.

12. A power conversion system, comprising:
a power converter having a primary stage and a secondary stage coupled to provide an output DC voltage from an input voltage source;
the power converter coupled to a controller;
the controller having a self-adjusting set-point control scheme to generate the output DC voltage, wherein the output DC voltage follows an input voltage over a portion of an entire range of the input voltage, where the portion is based on the input voltage value; and
a parallel power converter coupled to the DC output voltage, wherein the power converter and the parallel power converter share a load current by employing a droop characteristic that does not require communication between the power converter and the parallel power converter.

* * * * *